United States Patent [19]

Kadono et al.

[11] Patent Number: 5,376,971
[45] Date of Patent: Dec. 27, 1994

[54] PICTURE ENCODING APPARATUS AND PICTURE DECODING APPARATUS

[75] Inventors: Shinya Kadono, Katano; Masakazu Nishino, Kashiwara, both of Japan

[73] Assignee: Matsushita Electric Industrial Co., Ltd., Osaka, Japan

[21] Appl. No.: 113,175

[22] Filed: Aug. 30, 1993

[30] Foreign Application Priority Data

Sep. 30, 1992 [JP] Japan ................. 4-261153

[51] Int. Cl.⁵ .................. H04N 7/130; H04N 7/133; H04N 7/137
[52] U.S. Cl. .................. 348/699; 348/414; 348/416
[58] Field of Search .......... 358/136, 133, 105; H04N 7/130, 7/133, 7/137; 348/699, 416, 414; 382/30

[56] References Cited

U.S. PATENT DOCUMENTS

| | | | |
|---|---|---|---|
| 4,819,169 | 4/1989 | Saitoh et al. | 348/116 |
| 4,855,822 | 8/1989 | Narendra et al. | 348/114 |
| 4,975,976 | 12/1990 | Kimata et al. | 382/44 |
| 5,019,910 | 5/1991 | Uomori et al. | 348/699 |
| 5,214,504 | 5/1993 | Torin et al. | 348/416 |
| 5,280,530 | 1/1994 | Trew et al. | 382/30 |

FOREIGN PATENT DOCUMENTS

| | | |
|---|---|---|
| 2226888 | 2/1989 | Japan . |
| 4-56491 | 6/1990 | Japan . |
| 5130581 | 10/1991 | Japan . |

Primary Examiner—Tommy P. Chin
Assistant Examiner—Vu Le
Attorney, Agent, or Firm—Wenderoth, Lind & Ponack

[57] ABSTRACT

An input picture is blocked in units of a specific number of pixels. A picture corresponding to a reference picture of the input picture is stored in a memory. A motion compensating circuit compares the reference picture stored in the memory and the input picture to calculate a transformation coefficient of an affine transformation making the pixel value difference between the both pictures small. The affine transformation is equivalent to panning or zooming, thus calculation being made for each picture or for every plural pictures. In addition, the motion compensating circuit transforms the input picture with the affine transformation coefficient thus calculated. An encoder collectively encodes the reference picture signal and the transformed signals of all other pictures and simultaneously encodes the affine transformation coefficient to generate an encoded signal.

3 Claims, 4 Drawing Sheets

FIG. 8
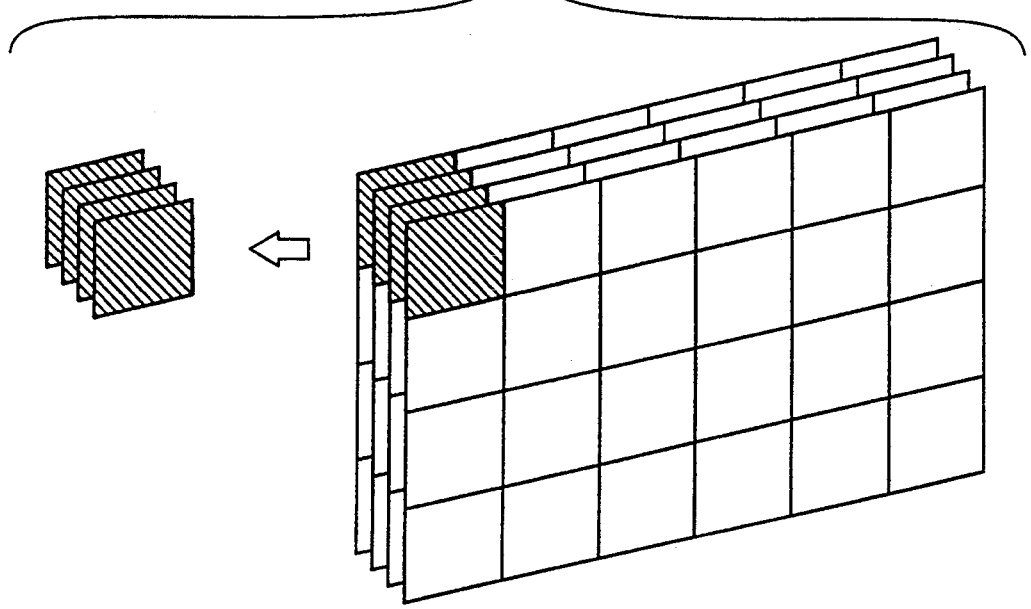
FIG. 6a  FIG. 6b  FIG. 6c
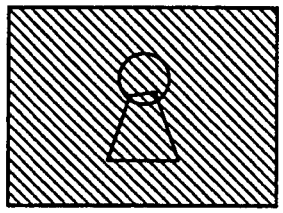 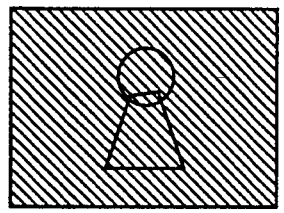 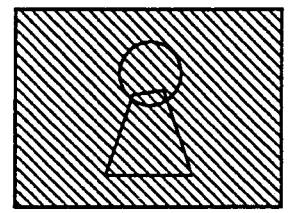
FIG. 6d  FIG. 6e
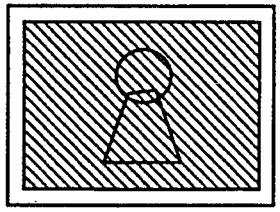 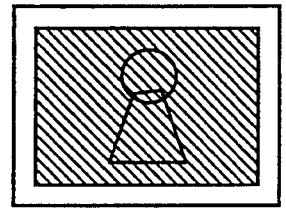
FIG. 7
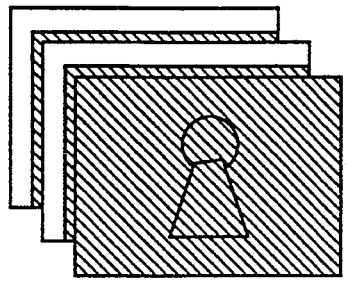

PICTURE ENCODING APPARATUS AND PICTURE DECODING APPARATUS

BACKGROUND OF THE INVENTION

1. Field of the Invention

This invention relates to a picture encoding apparatus used for reducing the bit rate of a picture signal for longterm recording, low rate transmission and other purposes, and to a picture decoding apparatus for decoding a signal encoded by the picture encoding apparatus.

2. Description of the Prior Art

As a conventional picture encoding apparatus, for example, a motion compensation inter-frame/intra-frame encoding apparatus is disclosed in Japanese Laid-Open Patent Application No. 4-68989.

This picture encoding apparatus compares through a motion vector detector a decoded picture signal of a preceding picture as a reference picture and an input picture to detect such motions as panning (parallel movement) and zooming (enlargement and reduction). Then, a motion compensating circuit effects parallel movement, enlargement and reduction the whole of the reference picture so as to cancel the detected panning and/or zooming to generate a compensated reference picture whereby the pixel value difference between the input picture and the compensated reference picture is made small. In this case, a differential signal for each pixel between the input picture and the compensated reference picture is calculated by an inter-frame differential calculator. An inter-frame/intra-frame selector selects the differential signal or the input picture signal depending on the magnitude of the differential signal obtained by the inter-frame differential calculator and outputs the selected signal to an encoder for encoding. Furthermore, the encoded signal is simultaneously decoded by a decoder and stored in a frame memory to be used as the reference picture for encoding of the next picture.

With the structure as shown above, however, the decoded signal of the preceding picture is used as the reference picture when the present picture is encoded. As a result, the present signal cannot be encoded if the preceding picture is not encoded and decoded. Therefore, it is impossible to encode plural pictures in parallel, so that the use high speed operable components is necessary, making hardware implementation difficult.

SUMMARY OF THE INVENTION

In consideration of the above-mentioned problems, an object of this invention is to provide a picture encoding apparatus which compensates such motions as panning, zooming and the like without using a decoded picture, and even when plural pictures are collectively simultaneously encoded, such motions as above can be compensated so that the encoding efficiency can be largely improved.

A picture encoding apparatus of this invention comprises memory for receiving a picture sequence in a unit of a predetermined number of pictures as an input signal to store a reference picture which is one picture at a specific position of the input signal, a motion estimating-/compensating unit for comparing non-reference pictures which are pictures other than the reference picture of the input signal and the reference picture stored in the memory to apply the non-reference pictures with an affine transformation which cancels a motion of the whole of the pictures to make a pixel value difference between the pictures small to thereby generate a compensated picture, and an encoding unit for generating an encoded coefficient signal obtained by encoding a transformation coefficient of the affine transformation and an encoded picture signal obtained by encoding the reference picture and the compensated picture in the picture sequence.

A picture decoding apparatus of this invention comprises decoding unit for receiving an encoded coefficient signal and an encoded picture signal which are encoded by the picture encoding apparatus described above to decode an affine transformation coefficient, a reference picture and a compensated picture, and affine transformation unit for applying an affine transformation which is an inverse transformation to the transformation indicated by the affine transformation coefficient for the compensated picture to thereby generate a decoded picture.

With the structure as shown above, the picture encoding apparatus of this invention calculates a motion of the whole of the pictures between the reference picture and non-reference pictures in the picture sequence and applies to the non-reference pictures an affine transformation which cancels the motion to thereby make small the pixel value difference between the reference picture and non-reference pictures. The affine transformation is called motion transformation in that it compensates a pixel motion. The picture sequence may be composed of two or more continuous pictures, such as, for example, two frames or four frames. The reference picture may be one picture predetermined in the picture sequence, such as, for example, the first frame or the central frame of such picture sequence. As the motion of the whole of the pictures, panning and zooming each being a motion of a camera are typical. The compensated pictures made small in pixel difference from the reference picture through the motion compensation are collectively encoded for each picture sequence. One example of encoding will be explained with reference to FIGS. 6 (a), 6(b) and 6(c). A picture shown in FIG. 6 (a) is a reference picture, and those shown in FIGS. 6 (b) and 6 (c) are enlarged views of the same. As a result, the pictures shown in FIGS. 6 (b) and 6 (c) are reduced by the affine transformation respectively to those shown in FIGS. 6 (d) and 6 (e) and collectively encoded together with the reference picture shown in FIG. 6 (a) as shown in FIG. 7. The peripheral part of each of the pictures shown in FIGS. 6 (d) and 6 (e) does not have a pixel and a predetermined value is inserted. By collectively encoding the three pictures, it becomes possible to effect an effective compression using the time direction component as well as to control code amount so as to become a fixed length in the three-picture unit. A conventional picture encoding apparatus using motion compensation requires a decoded picture for encoding and as a result, it is impossible to control the code amount so as to become a fixed length in the unit of plural pictures without degrading coding efficiency. The fact that the code length is fixed makes it possible to improve the picture quality in a special reproduction of a VTR as well as to reduce the picture quality degradation due to reproduction error. The parameters of the affine transformation are coded in the encoding means and sent to the decoding means. The affine transformation is reversible except for the transformation error in enlargement or reduction , and if such transformation error is adequately small compared with the coding error, the encoded signal can be decoded with almost no degradation of picture quality in the decoding apparatus.

BRIEF DESCRIPTION OF THE DRAWINGS

FIGS. 6(a) through 6(e) are diagrams for explaining a motion compensation (affine transformation).

FIG. 7 is a diagram for explaining an encoding using motion compensation.

FIG. 8 is a diagram for explaining a blocking.

DESCRIPTION ON THE PREFERRED EMBODIMENTS

Figure 1:
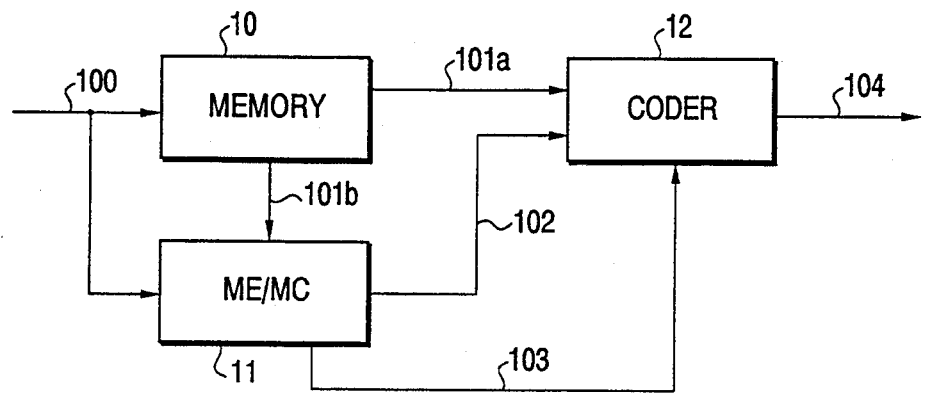
FIG. 1 is a block diagram of a picture encoding apparatus according to a first embodiment of this invention.

FIG. 1 is a block diagram of a picture encoding apparatus according to a first embodiment of this invention, in which an input signal 100 is a picture sequence in a unit of a fixed number of pictures. A reference picture of the input signal 100 is stored in a memory 10. The reference picture is one picture which is predetermined in the picture sequence. As examples, it may be the first occurring frame or the center frame of the input signal 100. A motion estimating/compensating (ME/MC) circuit 11 compares the reference picture 101b stored in the memory 10 and each of the non-reference pictures (pictures other than the reference picture) of the input signal 100 to calculate a coefficient 103 of such an affine transformation as to make the pixel value difference small. The term affine transformation denotes a geometrical transformation which can be expressed in terms of movement, enlargement and reduction. The input signal 100 is subjected to the affine transformation by the transformation coefficient 103 thus obtained to be outputted as a compensated picture 102. The transformation coefficient 103 is calculated for each picture or for each picture sequence unit. An encoder 12 collectively encodes a reference picture 101a and the compensated picture 102, and further simultaneously encodes the transformation coefficient 103 to thereby generate an encoded signal 104. The encoding is collectively carried out in the picture sequence. The correlation between pictures may be enhanced by performing affine transformation as compared with the case of not performing the same and as a result, the encoding efficiency when collectively encoding in the picture sequence becomes high. Additionally, a decoded signal may not be needed for encoding, and it is easy to make a fixed code length in the picture sequence by feedback control.

As explained above, according to this embodiment, by performing affine transformation through the ME/MC circuit 11, the correlation between plural pictures can be enhanced to thereby improve the encoding efficiency.

Figure 2:
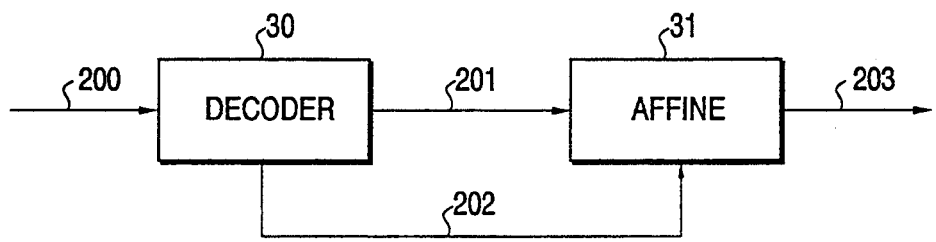
FIG. 2 is a block diagram of a picture decoding apparatus according to a second embodiment of this invention.

FIG. 2 is a block diagram of a picture decoding apparatus according to a second embodiment of this invention, in which an encoded signal 200 corresponds to the encoded signal 1 04 obtained by the picture encoding apparatus shown in FIG. 1. A decoder 30 decodes the encoded signal 200 to deliver a picture signal 201 and an affine transformation coefficient 202. An affine transformation circuit 31 transforms the picture signal 201 inversely to the affine transformation indicated by the affine transformation coefficient 202 and its result is as a decoded picture 203. In addition, the picture corresponding to the reference picture is not subjected to affine transformation, so that the affine transformation is carried out by the affine transformation coefficient corresponding to the case of having no movement, enlargement and reduction.

As explained above, according to this embodiment, the affine transformation circuit 31 performs an inverse transformation to the affine transformation carried the picture encoding apparatus, so that the encoded signal obtained in the picture encoding apparatus can be decoded successfully.

Figure 3:
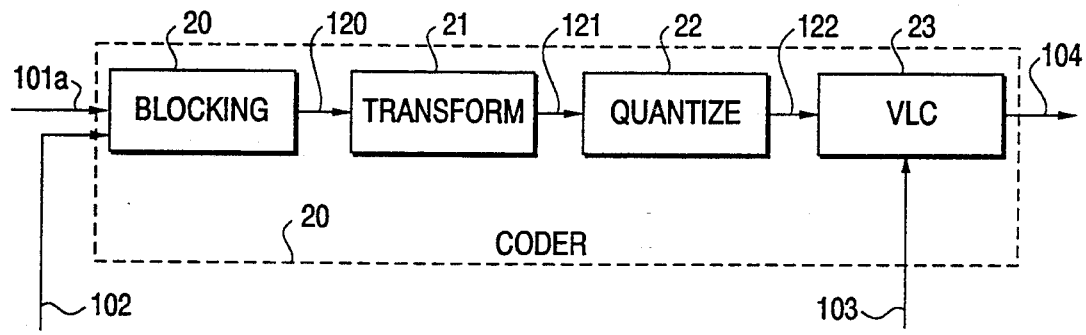
FIG. 3 is a block diagram of an encoder of the picture encoding apparatus shown in FIG. 1.

FIG. 3 is a block diagram of the encoder 12 shown in FIG. 1. In the first embodiment, explanations were made such that a picture was directly encoded, however, it more efficient on a practical basis that when encoding the input signal in the picture sequence, it is spatially divided into smaller units (blocks) to be encoded. By dividing the picture into small blocks as such, a pixel signal can be frequency-converted by orthogonal transformation to protect visually important low frequency components to thereby improve the picture quality thereof, and the bit rate to be processed by the encoder at one time can be reduced to thereby simplify the hardware. FIG. 8 is an explanatory diagram of blocking, in which the signal sequence is composed of four pictures, and the pixels at the same positions in these four pictures are collected to make a block (shaded areas make one block as shown in FIG. 8). Namely, the four pictures are composed of a plurality of blocks. Referring to FIG. 3, the reference picture 101a and the compensated picture 102 are divided into rectangular parallelepiped blocks in a blocking circuit 20 to output a blocked signal 120. The blocked signal 120 is sent to an orthogonal transformation circuit 21 to be subjected to orthogonal transformations horizontally, vertically and between pictures to output an orthogonally transformed signal 121. The reference picture and compensated picture become large in correlation therebetween by being subjected to affine transformation, so that the energy is concentrated into the low frequency component by orthogonal transformation. As a result, the high frequency component becomes small. The orthogonally transformed signal 121 is quantized by a quantizer 22 to obtain a quantization value 122. In general, the quantization step of visually important low frequency components is made small and the quantization step of high frequency components is made large. As a result, the quantization value 122 can be made small without degrading picture quality. The quantization value 122 is encoded through a variable length encoder (VLC) 23 to obtain an encoded signal 104. In the variable length encoder 23, a code small in bit length is allocated to a quantization value high in generation probability and a code large in bit length is allocated to that not so high in generation probability, whereby the average code length is made small. In addition, in the encoder 23, when encoding the quantization value 122 as an encoded picture signal, an affine transformation coefficient 103 is also encoded as an encoded coefficient signal, and the encoded picture signal and encoded coefficient signal are multiptexed to obtain the encoded signal 104.

With the encoder structured as shown above, the efficiency of the picture encoding apparatus shown in FIG. 1 can be improved.

Figure 4:
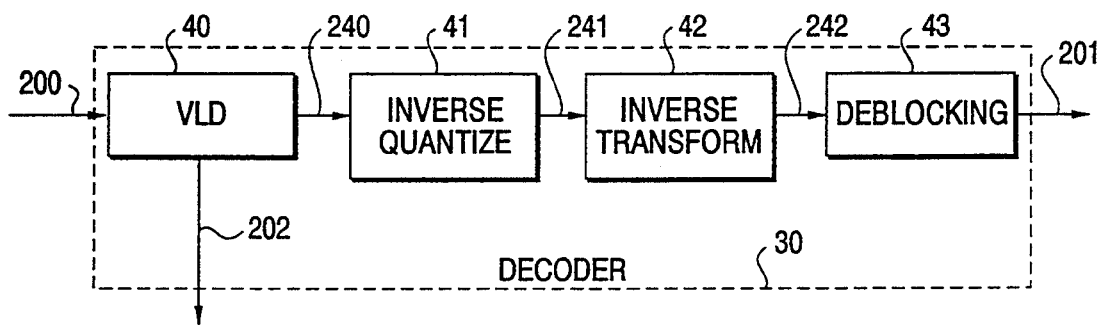
FIG. 4 is a block diagram of a decoder of the picture decoding apparatus shown in FIG. 2.

FIG. 4 is a block diagram of a decoder 30 shown in FIG. 2, which is for decoding the encoded signal 104 encoded by the encoder 20 shown in FIG. 3. An encoded signal 200 is decoded through a variable length decoder (VLD) 40 to deliver a quantization value 240 which is a signal corresponding to the pixel value, and an affine transformation coefficient 202. The quantization value 240 is the same in value as the quantization value 122 of the corresponding signals of the encoder shown in FIG. 3. The quantization value 240 is inversely quantized by an inverse quantizer 41 to output an inverse quantization value 241. The inverse quantization value 241 is subjected to inverse orthogonal transformation by an inverse orthogonal transformation circuit 42 to obtain an inversely orthogonally transformed signal 242. The transformation carried out in the inverse orthogonal transformation circuit 42 is an inverse transformation to the transformation carried out in the orthogonal transformation circuit 21 in the encoder 20 shown in FIG. 3. The inversely orthogonally transformed signal 242 is deblocked in a deblocking circuit 42 to be re-arranged so as to form a picture to thereby obtain a picture signal 201. The re-arrangement of pixels in the deblocking circuit 43 is opposite in operation to that in the blocking circuit 12 shown in FIG. 3. As a result, by carrying out the inverse blocking as shown above, a picture that has pixels arranged correctly can be obtained.

With the decoder structured as shown above, the encoded signal encoded through the encoder shown in FIG. 3 can be correctly decoded.

Figure 5:
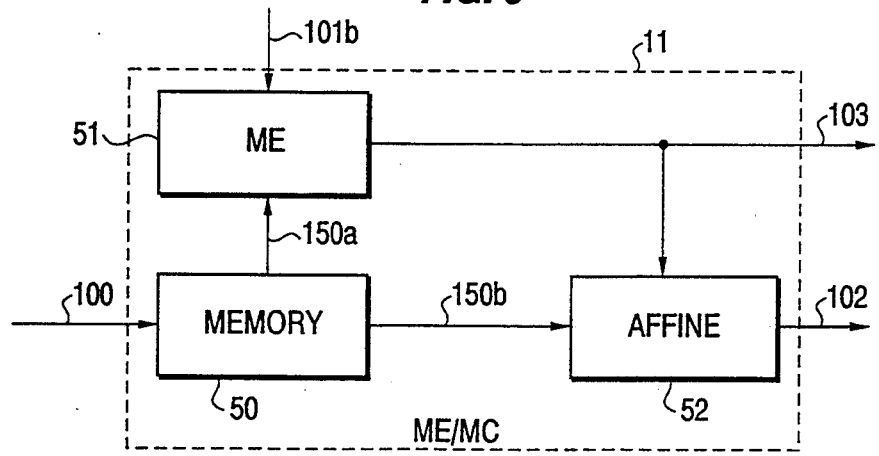
FIG. 5 is a block diagram of a motion compensating circuit of the picture encoding apparatus shown in FIG. 1.
Figure 9:
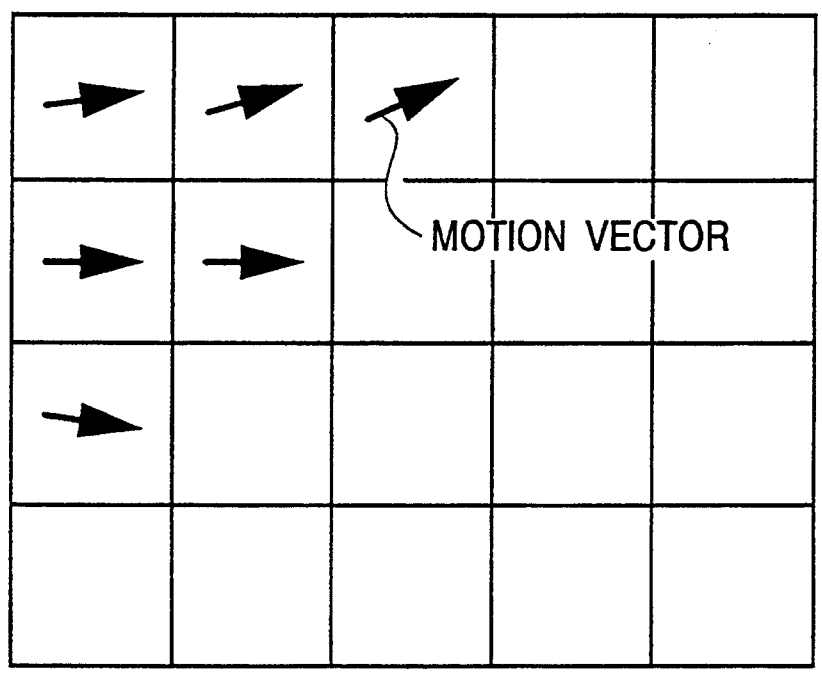
FIG. 9 is a diagram for explaining panning and zooming calculations.

FIG. 5 is a block diagram of a motion compensating circuit 11 of the picture encoding apparatus shown in FIG. 1. The input picture 100 is temporarily stored in a memory 50. A motion estimating circuit (ME) 51 compares a memory output 150a and the reference signal 101b to detect the motion of a picture signal stored in the memory 50. From the motion thus detected, the motion of the whole of the pictures, such as panning, zooming and the like, is calculated and transformed into an affine transformation coefficient 103. For example, as shown in FIG. 9, if a picture is divided into blocks and the motion vector is calculated for each block, the average value of all motion vectors is equivalent to the magnitude of panning and the rate of change of the motion vector of an adjacent block is equivalent to the magnitude of zooming. An affine transformation circuit 52 applies affine transformation to a memory output 150b in terms of the affine transformation coefficient 103 to thereby obtain a compensated picture 102.

With the motion compensating circuit 11 structured as shown above, the affine transformation coefficient of the picture encoding apparatus shown in FIG. 1 can be calculated.

In addition, in the encoder shown in FIG. 3 and the decoder shown in FIG. 4, the sub-band transformation or the estimation coding may be applied instead of the orthogonal transformation. In general, if a pair of transformations are inverse to each other and can be applied in order to decode correctly to the original signal, they may be respectively used instead of the transformation of the orthogonal transformation circuit 21 shown in FIG. 3 and the inverse transformation of the inverse orthogonal transformation circuit 42 shown in FIG. 4.

What is claimed is:

1. A picture encoding apparatus for encoding an input signal indicative of an input picture sequence of a plurality of pictures, comprising:

predetermined one of said plurality of pictures from among a picture sequence unit formed by a predetermined number of said plurality of pictures of said input picture sequence of said input signal;

motion estimating/motion compensating means, coupled to said memory means, for comparing non-reference pictures of said input picture sequence which are pictures of said picture sequence unit other than said reference picture and said reference picture stored in said memory means to determine a transformation coefficient of an affine transformation which cancels an overall motion of said picture sequence unit by reducing a pixel value difference between said pictures of said picture sequence unit, and for subjecting said non-reference pictures to said affine transformation having said transformation coefficient to generate a motion compensated picture; and encoding means, coupled to said memory means and said motion estimating/motion compensating means, for generating an encoded coefficient signal obtained by encoding said transformation coefficient of said affine transformation and an encoded picture signal obtained by encoding said reference picture and said motion compensated picture.

2. A picture encoding apparatus as claimed in claim 1, wherein said encoding means comprises a blocking circuit for dividing said reference picture and said motion compensated picture into blocks each consisting of a plurality of pixels, and an encoder for collectively encoding said blocks of said reference picture and said motion compensated picture which are located at a same picture position.

3. A picture decoding apparatus comprising:

decoding means for receiving an encoded coefficient signal and an encoded picture signal generated by a picture encoding apparatus, and for decoding therefrom an affine transformation coefficient, a reference picture and a motion compensated picture; and affine transformation means, coupled to said decoding meads, for subjecting said motion compensated picture to an affine transformation which is an inverse transformation to a transformation indicated by said affine transformation coefficient to generate a corresponding decoded picture, and for outputting said reference picture and said decoded picture as a decoded signal.

* * * * *